March 19, 1957  M. W. THIEL  2,785,493
LIGHTING ATTACHMENT FOR FISHING DEVICES
Filed Sept. 12, 1955
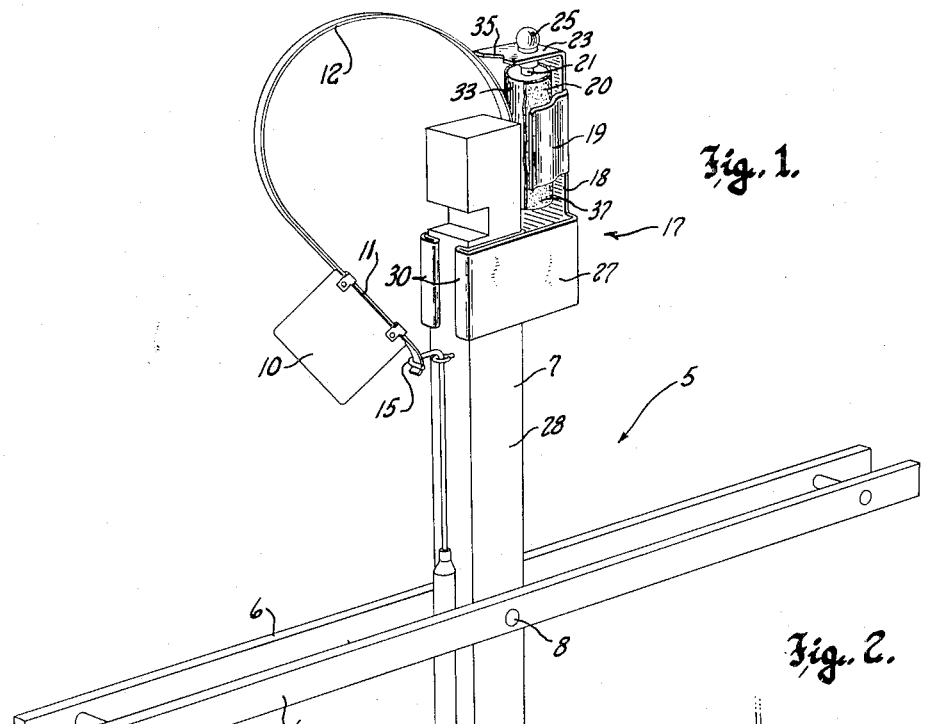
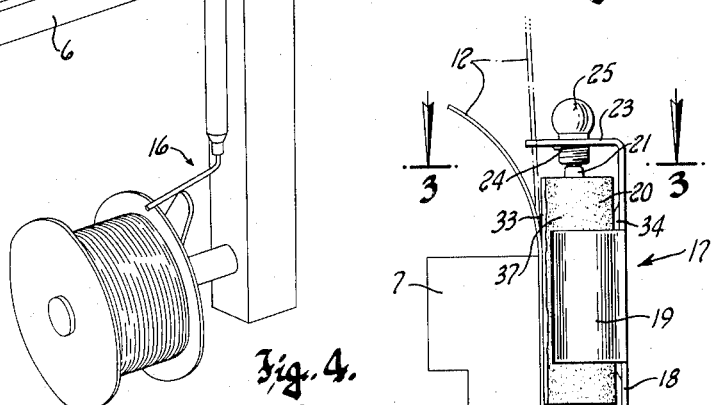
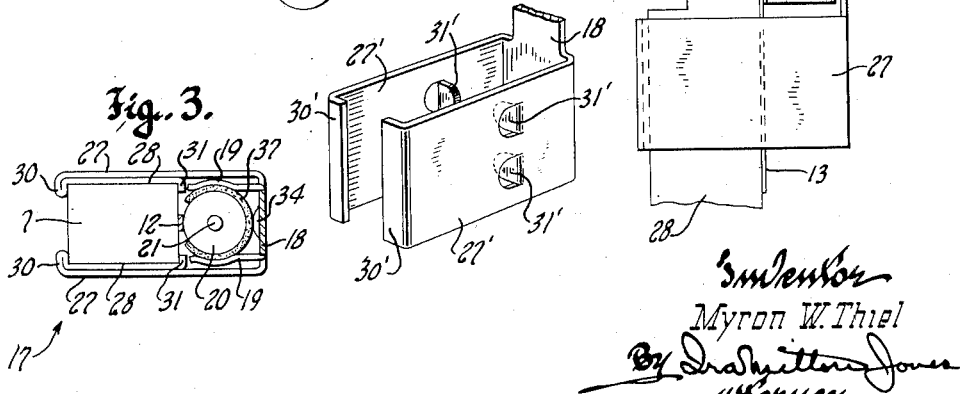
Inventor
Myron W. Thiel

United States Patent Office 2,785,493
Patented Mar. 19, 1957

2,785,493

LIGHTING ATTACHMENT FOR FISHING DEVICES

Myron W. Thiel, Mayville, Wis.

Application September 12, 1955, Serial No. 533,776

2 Claims. (Cl. 43—17)

This invention relates to fishing apparatus and has more particular reference to the provision of a lighting attachment for fishing devices generally but more specifically intended for use with ice fishing tiltups.

The construction and operation of the ordinary ice fishing tiltup is well known. In general, it is characterized by an upright post having a spring wire fixed to the upper end portion thereof. In use, the wire is held in a downwardly bowed attitude by a latch which releases the wire whenever a fish strikes. When released, the wire snaps back to a vertical position at which a signal flag on the upper free end of the wire signals the strike to the fisherman attending the tiltup.

While these tiltups with flag carrying spring wires serve their intended purpose quite satisfactorily during day-time fishing hours, they are obviously inadequate for night fishing, or whenever there is insufficient light for the fisherman to plainly see the upraised flag after the spring wire has been released.

It is the purpose of this invention, therefore, to provide a lighting attachment for fishing devices of the type having an upright post with spring wire flag carrying signal means thereon, which attachment may be quickly applied to the post without tools and without entailing any modification of the fishing device.

More specifically, it is the purpose of this invention to provide a unitary lighting attachment for ice fishing tiltups or other fishing devices having an upright post and a spring wire signalling device secured to its upper end, wherein the energizing circuit for an incandescent lamp carried by the attachment is completed through the spring wire itself when it snaps to its normally vertical position upon being released from its latch.

A further object of this invention resides in the provision of an exceptionally simple and inexpensive but durable and reliable lighting attachment for fishing devices, wherein the attachment is powered by an ordinary dry cell and is so constructed that the dry cell may be easily and quickly replaced without removing the attachment from the fishing device.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawing illustrates two complete examples of the physical embodiments of the invention constructed according to the best modes so far devised for the practical application of the principles thereof, and in which:

Figure 1 is a perspective view of an ice fishing tiltup of conventional construction having the lighting attachment of this invention mounted thereon;

Figure 2 is an enlarged fragmentary side elevational view of the upper end portion of the post of the tiltup and the lighting attachment thereon;

Figure 3 is a horizontal sectional view taken through Figure 2 along the plane of the line 3—3; and Figure 4 is a fragmentary perspective view of the bottom portion of the attachment showing a slightly modified form of mounting means therefor.

Referring now more particularly to the accompanying drawing, in which like numerals designate like parts, the numeral 5 generally indicates an ice fishing tiltup of conventional construction. Briefly, the tiltup comprises a cross-bar 6 to rest on the ice spanning a hole therein, and an upright post 7 pivotally supported as at 8 by the cross-bar, medially of its ends. The post is usually of rectangular cross section, as shown.

The signal for the tiltup comprises a flag 10 fixed to the free end portion 11 of a spring wire or blade 12. The other end portion 13 of the wire is anchored to the back of the post 7 as by staples or the like (not shown). The spring wire normally occupies a vertical position projecting straight upwardly above the top of the post 7, but as indicated in Figure 1, it may be flexed forwardly and downwardly into a bowed attitude in which it is held by a hook 15 forming part of a releasable latch mechanism 16. This latch mechanism is well known to the art and needs no further description.

It will suffice to point out that when a fish accepts the offered bait, the latch mechanism is tripped to disengage the hook 15 from the free end portion 11 of the spring wire, and the latter snaps upwardly to its normally straight vertical position as indicated in construction lines in Figure 2.

While the flag 10 on the free end portion 11 of the spring wire is easily visible during the day-time, it is hard to detect during periods of growing darkness and cannot be seen at all at night. At such times there is no way for the fisherman to know whether his line needs attention or not.

The present invention overcomes this shortcoming of the conventional ice fishing tiltup through the provision of a lighting attachment generally designated 17 which may be readily attached to the upper end of the post 7 of the device without tools or the need for modification or alteration of the tiltup.

The attachment comprises a bracket preferably made of sheet metal having resilient characteristics on the order of spring steel, and shaped to provide an elongated substantially flat upright body portion 18 having flaps 19 bent forwardly from its longitudinal edges to provide a clamp. An ordinary dry cell 20, which may be of the miniature type, is receivable in the clamp to be held thereby in a position closely overlying the front face of the body portion and with the center electrode 21 of the cell projecting upwardly.

At its upper end the body portion is bent forwardly to provide a flange 23 having a central aperture 24 therein shaped to threadedly receive the base of an incandescent lamp 25. When properly threaded into the aperture in the flange, the base of the lamp is disposed beneath the flange and the center terminal of the lamp aligns with and engages the center electrode 21 of the dry cell.

The bracket is also provided with mounting means beneath the clamp defining flaps 19, which enable the attachment to be readily applied to and firmly held in place on the upper end portion of the post 7. The mounting means shown in Figures 1, 2 and 3 comprises a pair of flat opposing transversely spaced arms 27 integrally joined to the body portion and projecting forwardly therefrom a substantial distance beyond the dry cell clamp to flatwise embrace the post 7. The arms 27, which have substantial width, are also biased toward one another so as to exert clamping pressure against the opposite side faces 28 of the post 7.

For maximum sturdiness, the arms 27 may be folded inwardly upon themselves as shown in Figure 3, so that the thickness of each arm is twice that of the body portion 18. Good stability for the attachment is afforded by the provision of fingers 30 bent inwardly from the foremost ends of the arms to engage over the front face of the post and thus prevent motion of the bracket away from the back of the post. Additional fingers 31 on the arms, provided at the ends of their inwardly folded portions, engage against the back face of the post and cooperate with the fingers 30 to preclude all but sliding motion of the bracket onto and off of the post.

The locations of the fingers 30 and 31 bears a predetermined relationship to the clamp provided by the flaps 19 so as to assure firm engagement between the ground case 33 of the dry cell 20 and the spring wire 12 on the back of the post. When properly positioned on the post, therefore, the mounting means assures good electrical contact between the spring wire and the ground case of the cell at all times, and to prevent the wire from forcing the dry cell rearwardly in the clamp toward the body portion 18 of the bracket, the body portion may be provided with a vertically disposed inwardly indented rib 34, as seen in Figure 3, against which the cell bears.

The location of the front edge portions of the flange 23 is also important. Preferably the front edge of the flange extends forwardly slightly beyond a plane parallel to the body portion 18 of the bracket and tangent to the ground case 33 of the dry cell, so as to assure its engagement by the spring wire whenever the latter is released and snaps back to its normally vertical position.

From the description thus far it will be apparent that the spring wire 12 itself constitutes the bridge element which completes the energizing circuit for the incandescent lamp 25 whenever the wire is released and occupies its vertical position shown in construction lines in Figure 2. In order to assure the best possible electrical contact between the wire and the flange, the latter preferably has a notch 35 cut in its front edge portion, the notch being substantially V-shaped to provide converging side edges to bite into the edges of the spring wire or band 12. It will also be apparent that in order to assure sufficient contact pressure between the spring wire and the flange, the notched front edged portion of the latter must intercept the wire before it reaches a true vertical position after being released from the latch.

It is also important to electrically insulate the dry cell from the surrounding portions of the metal bracket, namely the clamp flaps 19 and the bead or rib 34 against which the cell bears when it is in place in the clamp. It is a feature of the present invention that the necessary electrical insulation 37 may be that which is normally provided on the exterior of a conventional type of dry cell, namely the tube of paper or the like surrounding the ground case and usually adhesively secured thereto.

At the side of the dry cell remote from the body portion 18, the insulation 37 must be stripped from the cell to expose its ground case 33 and assure direct contact thereof with the anchored end portion 13 of the spring wire 12.

If desired the mounting means for the bracket may be constructed in the manner illustrated in Figure 4 which discloses a simpler manner of forming the arms 27' without requiring them to be doubled back upon one another as in the previous embodiment of the invention. As shown in Figure 4 the arms 27' are of single thickness stock and integrally joined to the opposite upright edge portions of the body portion. At their forward extremities, the arms are bent in toward one another to provide the fingers 30' which engage over the front face of the post 7. The fingers 31' which bear against the rear face of the post are provided by tabs struck inwardly from the arms intermediate their outer ends and their junctions with the body portion.

From the foregoing description, taken together with the accompanying drawing, it will be readily apparent to those skilled in the art that the lighting attachment of this invention is not only simple, sturdy, and capable of production at low cost, but that it also fulfills a long-felt need by making night ice fishing with the conventional tiltup possible without any need for modification or alteration of the tiltup.

What is claimed as my invention is:

1. In fishing apparatus: a fishing device including an upright post, a spring wire having a flat end portion flatwise overlying and anchored to one face of the post, and having a free portion normally projecting vertically above the post but capable of being releasably latched in a downwardly bowed attitude; and an electrical signaling device on the upper end portion of the post, comprising a sheet metal bracket having an elongated flat upright body; means for readily detachably mounting the bracket on the upper end portion of the post with the bracket body disposed lengthwise adjacent and parallel to one face of the post, said means comprising a pair of substantially flat opposing arms integral with the lower portion of the body and bent outwardly to one side of the body from the opposite longitudinal edges thereof to snugly embrace two opposite faces of the post, said arms being biased toward one another so as to clampingly engage the post and having fingers projecting toward one another from the outer ends of the arms and opposing the body of the bracket, to engage a face of the post remote from the bracket body and other than those engaged by said arms so as to constrain the bracket to sliding motion lengthwise of the post onto and off of its upper end portion; means for holding a dry cell in position on the bracket with the cell lengthwise adjacent to one side of the body, its center electrode projecting upwardly, and with its ground case in electrically conductive relationship to the anchored end portion of the spring wire, said last named means including a pair of flaps integral with the body and bent outwardly from the opposite longitudinal edges of the body at locations above the mounting arms, said flaps opposing one another and having upright surfaces substantially parallel to said arms, and providing a clamp on the upper portion of the body to receive and hold a dry cell; means fixed on the upper end portion of the body providing a substantially horizontal electrically conductive flange extending over the clamp flaps and having an aperture to receive the threaded base of a light bulb with the center terminal of the bulb projecting downwardly for engagement with the center electrode of a dry cell in the clamp; and electrically conductive means fixedly connected with said flange and providing a contact located adjacent to the top of the bracket body and spaced from the adjacent free portion of said wire when the latter is in said bowed attitude but disposed to be engaged by the wire in the normal vertical position thereof to complete an energizing circuit for a light bulb mounted in the flange aperture.

2. The fishing apparatus set forth in claim 1, wherein the bracket body is disposed in spaced opposing relation to the anchored end portion of the spring wire, and wherein said flange is an integral part of the bracket body bent over from the upper end portion thereof and has the contact formed thereon, said flange, the clamp flaps, and the mounting arms projecting to the same side of the body, toward the post, whereby a dry cell in the clamp will be interposed between the body and the anchored end portion of the spring wire and may have its ground case in direct engagement with the wire; portions of the mounting arms being disposed directly beneath the clamp flaps and being spaced apart a distance no less than said flaps so that a dry cell may be installed on or removed from the signaling device by moving the cell axially through the space between the mounting arms.

(References on following page)

References Cited in the file of this patent

UNITED STATES PATENTS

| | | |
|---|---|---|
| 1,462,054 | Tangee | July 17, 1923 |
| 2,032,537 | Kozikowski | Mar. 3, 1936 |
| 2,236,071 | Roskam et al. | Mar. 15, 1941 |
| 2,651,875 | Brockman | Sept. 15, 1953 |
| 2,680,842 | Opphile | June 8, 1954 |
| 2,704,411 | Carroll | Mar. 22, 1955 |
| 2,714,270 | Premo | Aug. 2, 1955 |
| 2,741,054 | Brundage | Apr. 10, 1956 |